United States Patent [19]
Takamiya et al.

[11] Patent Number: 5,926,276
[45] Date of Patent: Jul. 20, 1999

[54] APPARATUS HAVING AN AFOCAL LENS SYSTEM USED IN OPTICAL MEASUREMENT OF DISPLACEMENT

[75] Inventors: Makoto Takamiya, Tokyo; Shigeki Kato, Utsunomiya, both of Japan

[73] Assignee: Canon Kabushiki Kaisha, Tokyo, Japan

[21] Appl. No.: 08/835,462

[22] Filed: Apr. 8, 1997

[30] Foreign Application Priority Data

Apr. 15, 1996 [JP] Japan .................................... 8-092469

[51] Int. Cl.⁶ ...................................................... G01B 9/02
[52] U.S. Cl. .......................................... 356/356; 356/28.5
[58] Field of Search .................................. 356/28.5, 356, 356/358; 250/237 G

[56] References Cited

U.S. PATENT DOCUMENTS

| | | | |
|---|---|---|---|
| 5,483,332 | 1/1996 | Takamiya et al. ...................... | 356/28.5 |
| 5,502,466 | 3/1996 | Kato et al. .............................. | 356/356 |
| 5,552,879 | 9/1996 | Takamiya et al. ...................... | 356/356 |
| 5,629,793 | 5/1997 | Takamiya et al. ...................... | 359/278 |
| 5,640,239 | 6/1997 | Takamiya et al. ...................... | 356/345 |

FOREIGN PATENT DOCUMENTS

| | | |
|---|---|---|
| 04-230885 | 8/1992 | Japan . |
| 407055940 | 3/1995 | Japan . |

*Primary Examiner*—Samuel A. Turner
*Attorney, Agent, or Firm*—Fitzpatrick, Cella, Harper & Scinto

[57] ABSTRACT

An optical displacement measuring apparatus including an afocal optical system within a plane containing paths of at least two light beams. The afocal optical system includes a first lens optical unit and a second lens optical unit having a focal length which is greater than the focal length of the first lens optical unit. The distance between a diffraction grating and the first lens optical unit is smaller than the focal length of the first lens optical unit. The second lens optical unit is a combination of a lens with a negative refractive power and a lens with a positive refractive power. Accordingly, the optical displacement measuring apparatus performs accurate measurements with a large measurement depth, even for the cases where an afocal optical system is constructed within a plane containing the paths of the two light beams and the working distance is increased without increasing the size of an optical head.

13 Claims, 6 Drawing Sheets

APPARATUS HAVING AN AFOCAL LENS SYSTEM USED IN OPTICAL MEASUREMENT OF DISPLACEMENT

BACKGROUND OF THE INVENTION

Field of the Invention

The present invention broadly relates to an optical displacement measuring apparatus. More particularly, the present invention relates to an optical displacement measuring apparatus making use of the Doppler effect to determine the displacement of, for example, a moving object or fluid (hereinafter referred to as "moving object") and measure the velocity of the moving object, without contacting the moving object. The apparatus operates by irradiating light onto the moving object and detecting Doppler shifts in the frequency of the irradiated light scattered by the moving object in accordance with the velocity of the moving object.

2. Description of the Related Art

Laser Doppler speed meters have conventionally been used as apparatuses for accurately measuring the velocity of a moving object without contacting the moving object. The laser Doppler speed meter measures the velocity of a moving object by using the Doppler effect in which the frequency of a laser beam scattered by the irradiated moving object shifts in proportion to the velocity of the moving object.

Figure 1:
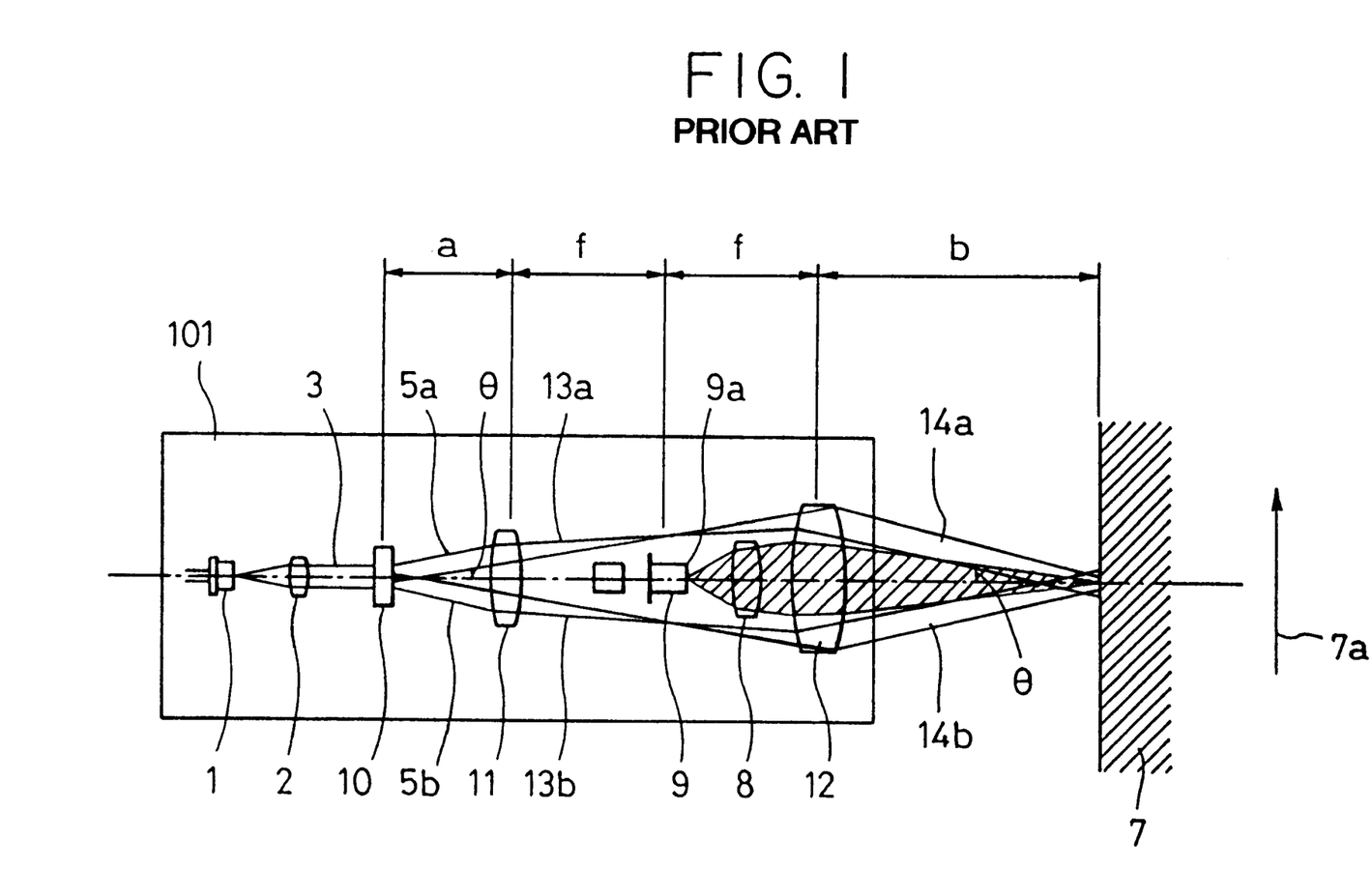
FIG. 1 is a schematic view of the main portion of a conventional laser Doppler speed meter.

FIG. 1 is a schematic view showing the main portion of an example of a laser Doppler speed meter disclosed in Japanese Unexamined Patent Publication No. 4-230885. Referring to FIG. 1, reference numeral 101 denotes a laser Doppler speed meter, reference numeral 1 denotes a laser beam, reference numeral 2 denotes a collimator lens, reference numeral 7 denotes a moving object to be measured, reference numeral 10 denotes a diffraction grating with a grating pitch d, and reference numerals 11 and 12 denote convex lenses each having a focal length f. When the distance from the diffraction grating 10 to the lens 11 is a, and the distance from the lens 12 to the object 7 to be measured is b, distances a and b satisfy the relationship a+b=2f.

The laser beam with a wavelength λ of about 0.68 μm is emitted from the laser diode 1 and converted into a parallel light beam 3 with a diameter of 1.2 mm by the collimator lens 2. The parallel light beam 3 impinges upon the transmission-type diffraction grating 10 with a grating pitch d of 3.2 μm in a direction vertical to the direction of orientation of the grating 10. Here, ± first order diffraction light beams 5a and 5b diffracted in accordance with Formula (1) set forth below leave the diffraction grating 10 at a diffraction angle θ=12°.

$$d \sin \theta = \lambda \quad (1)$$

The light beams 5a and 5b, which impinge upon a convex lens 11 with a focal length f=15 mm, are converted into light beams 13a and 13b, as shown in FIG. 1. The light beams 13a and 13b, which impinge upon the other convex lens 12 separated from the convex lens 11 by a distance of 2f (in this embodiment, 2f=30 mm), are reconverted into parallel light beams designated 14a and 14b, which irradiate the object 7 to be measured, moving in a direction indicated by arrow 7a at a velocity V (in mm/sec) as 1.2-mm diameter spots at an angle equal to the diffraction angle θ at which the light beams are diffracted.

The convex lens 12 and the converging lens 8 cause the light beams scattered by the object 7 to be measured to effectively converge onto a light receiving portion 9a of a photodetector 9, which detects a Doppler light signal with a frequency given by Formula (2):

$$F = 2V\sin\theta/\lambda \quad (2)$$
$$= 2V/d$$
$$= V/1.6 \text{ (kHz)}$$

where a=10 mm, and b=20 mm, so that b is relatively large. Therefore, the speed meter can be set with greater freedom at various locations by increasing the working distance.

In such a construction, when the laser beam wavelength λ of the laser diode 1 changes due to temperature changes or other factors, the diffraction angle θ changes in accordance with Formula (1), but from Formula (2) the Doppler signal ultimately does not depend on the laser beam wavelength λ, so that the laser Doppler speed meter provides excellent environmental stability.

The laser Doppler speed meter of FIG. 1 is constructed such that the diffraction angle of the light from the grating 10 is equal to the diffraction angle of the light at the object to be measured. Therefore, even when the laser wavelength changes, the Doppler signal does not change, as a result of which highly accurate speed measurements can be achieved. However, it has been necessary, in recent years, to further efficiently increase the working distance.

Figure 2:
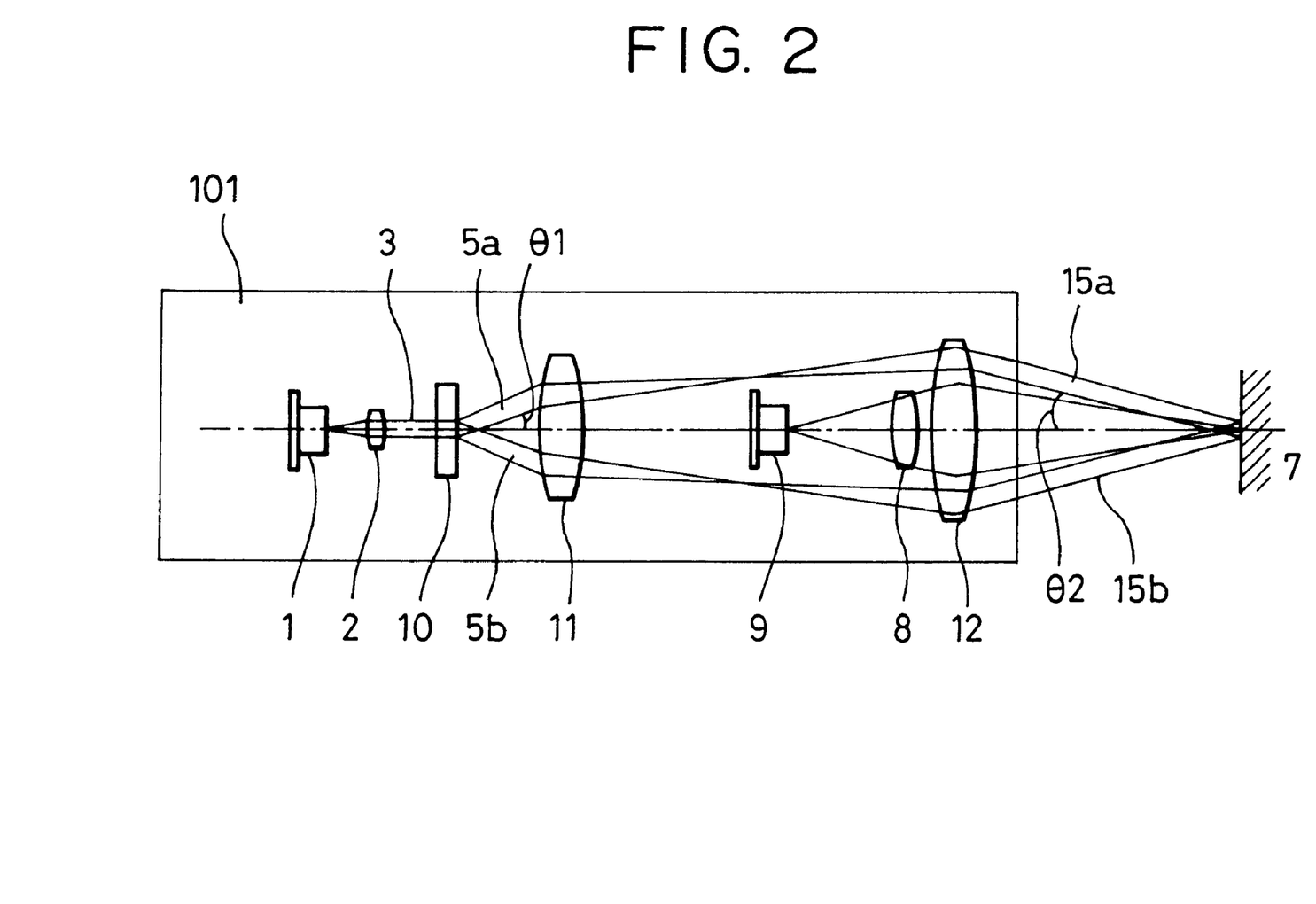
FIG. 2 is a schematic view of the main portion of a laser Doppler speed meter with a construction in which the diffraction angle does not equal the intersection angle.

FIG. 2 is a schematic view showing the main portion of a laser Doppler speed meter constructed in such a way that the diffraction angle does not equal the intersection angle. It has the same construction as that of the speed meter of FIG. 1, except that an afocal optical system, formed by lenses 11 and 12 with different focal lengths, is used. In this example, light beams 5a and 5b leave diffraction grating 10 at a diffraction angle θ1.

Here, the frequency of the Doppler signal is given by Formula (3):

$$F=2V \sin \theta 2/\lambda \quad (3)$$

where θ2 is the incident angle at which parallel light beams 15a and 15b impinge on object 7.

Figure 3:
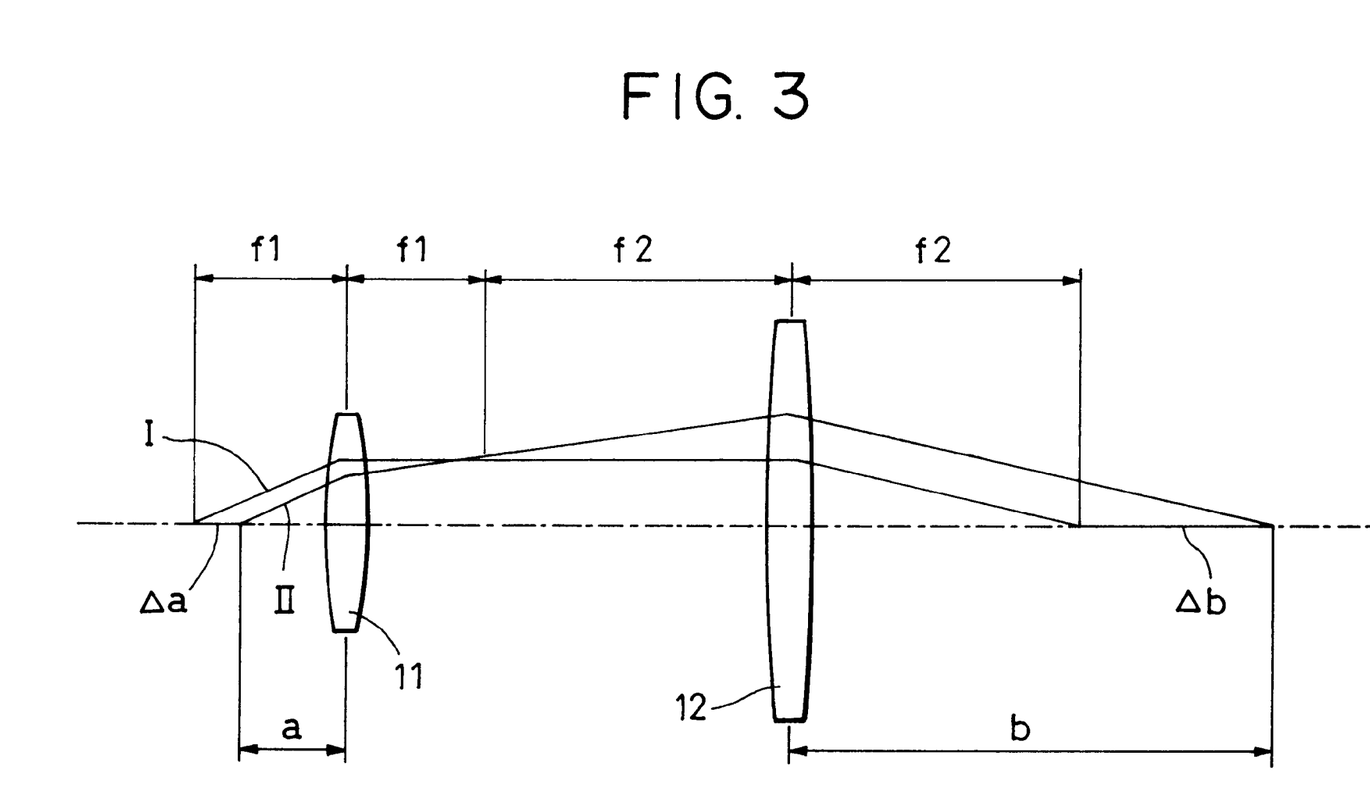
FIG. 3 is a view showing an afocal optical system composed of lenses with different focal lengths.

FIG. 3 is a view showing an afocal optical system whose lenses have different focal lengths. The first lens 11 with a focal length of f1 and the second lens 12 with a focal length of f2 are separated by a distance equal to f1+f2. The distance from the diffraction grating 10 to the first lens 11 is a, while the distance from the second lens 12 to the object 7 to be measured is b. In FIG. 3, a light beam I is formed when a=f1 and b=f2, while a light beam II is formed when a≠f1 and b≠f2, with a=f1−Δa and b=f2+Δb. The relationship between Δa and Δb is given by Formula (4):

$$b=(f2/f1)^2\Delta a \quad (4)$$

From the Formula, the working distance is made larger, without increasing the size of the laser Doppler speed meter itself, by increasing the f2/f1 ratio and decreasing a.

However, a further decrease in a in such an optical system with a relatively small f1 compared to f2 increases aberration, since the light beams impinge upon the outer periphery of the second lens, thereby making it difficult to provide a large measurement depth, while preserving high accuracy.

In addition, the use of an afocal optical system determines to a certain extent the arrangement of the optical system, thus making it difficult to further increase the working distance, while further decreasing the size of the optical system.

SUMMARY OF THE INVENTION

Accordingly, a first object of the present invention is to provide an optical displacement measuring apparatus which can make high accurate measurements with a large measurement depth, even for cases where the working distance is increased without increasing the size of the optical head.

A second object of the present invention is to provide an optical displacement measuring apparatus, incorporating an afocal optical system, which makes it possible to further decrease the size of the optical system and further increase the working distance.

According to one aspect of the present invention, an apparatus for obtaining displacement information of an object includes a light source, a diffraction grating, a lens system, and a light-receiving device. The diffraction grating divides a light beam from the light source into two light beam portions. The lens system causes the two light beam portions to intersect and impinge upon the object. The lens system includes first and second lens units. The second lens unit has a focal length larger than a focal length of the first lens unit to form an afocal system within a plane containing at least the two light beam portions. The second lens unit includes, from the side where the light beams impinge upon the second lens unit, a lens with a negative refractive power and a lens with a positive refractive power. The light-receiving device receives the light beams from the lens system scattered by the illuminated object to obtain displacement information of the object.

According to another aspect of the present invention, an apparatus for obtaining displacement information of an object includes a light source, a diffraction grating, a lens system, and a light-receiving device. The lens system of the apparatus in this aspect of the invention also includes first and second lens units. The principal plane of the second lens unit at the side of the object is located closer to the object than a surface of the second lens unit which opposes the object.

Other objects of the present invention will become more apparent from the following description of the preferred embodiments.

DESCRIPTION OF THE PREFERRED EMBODIMENTS

Figure 4A:
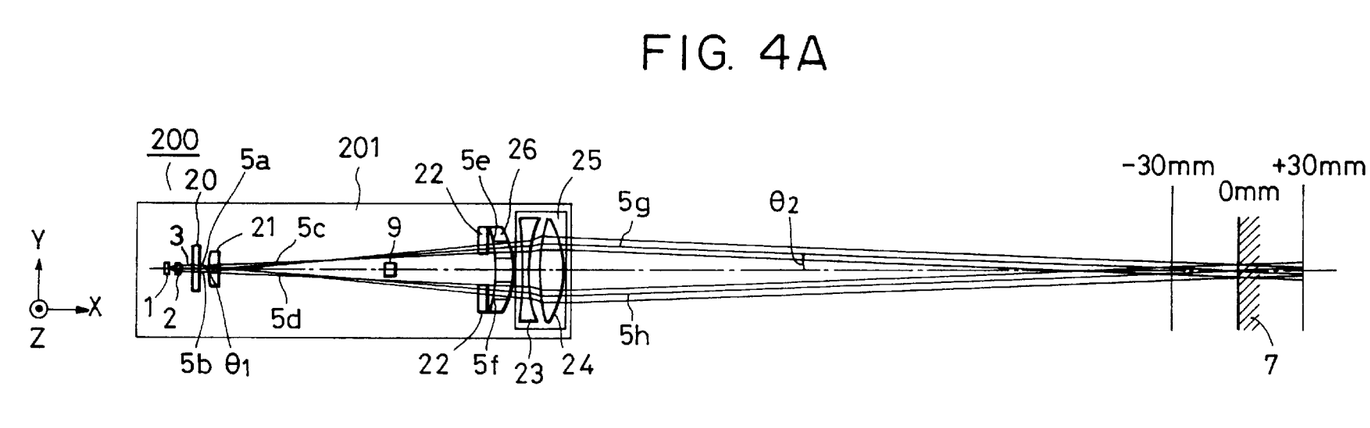
FIGS. 4A and 4B are views showing the optical structure of a laser Doppler speed meter of Embodiment 1 in accordance with the present invention.
Figure 4B:
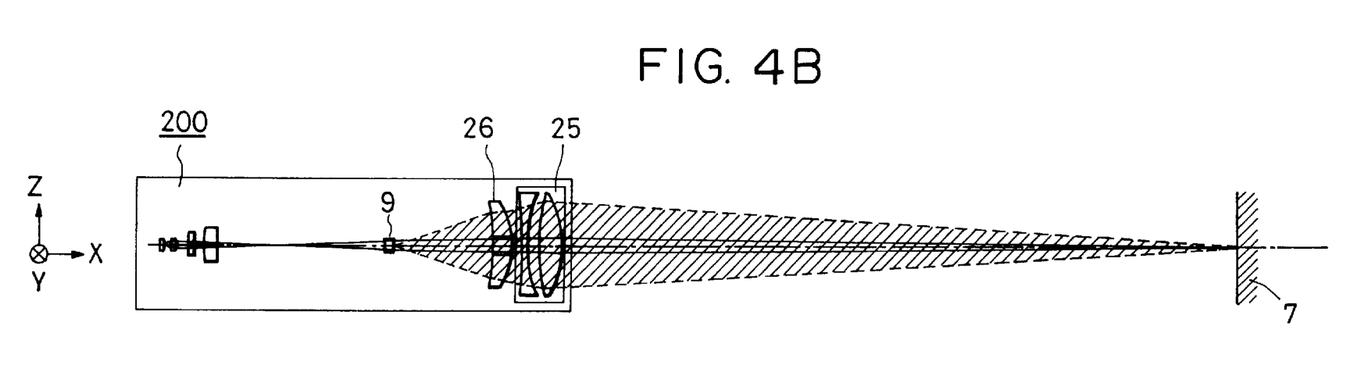

FIGS. 4A and 4B are a top view and a side elevational view, respectively, of the optical structure of a laser Doppler speed meter of Embodiment 1 in accordance with the present invention.

Reference numeral 200 denotes an optical head of the laser Doppler speed meter. In the speed meter 200, a laser beam from a laser diode 1 is converted into a parallel light beam 3 by a collimator lens 2. A laser unit formed by the laser diode 1 and the collimator lens 2 is composed of a material with a different thermal expansion coefficient from those of the materials of the other components (not shown). For example, the laser unit is composed of a material with a low thermal expansion coefficient, such as amber. Their positions are fixed, so that the collimated light beam from the collimator lens 2 remains collimated, even when a temperature change occurs. The parallel light beam 3 is split into light beams portions 5a and 5b within the XY plane at a diffraction angle of θ1 by a diffraction grating 20 having a grating pitch d, with the direction of orientation of the grating being in the direction of the y axis.

Here, the diffraction angle θ1 is obtained by Formula (5):

$$d \sin \theta_1 = \lambda \quad (5)$$

The light beams 5a and 5b, which pass through the first lens 21, becoming light beams 5d and 5c, respectively, and then pass through a cylindrical lens 22 (not shown in the side elevational view), where the beams are converted into light beams 5e and 5f which converge in the direction of the z axis in the measuring plane. Holes are formed in portions of a converging lens 26 in correspondence with the paths taken by the light beams 5e and 5f to prevent them from being refracted and to prevent reduction in the quantity of light. The two light beams 5e and 5f, which have passed through their respective holes, are refracted by a second lens unit 25 formed by a biconcave lens 23 and a biconvex lens 24, and converted into light beams 5g and 5h which are parallel in direction Y and converge in direction Z. At an incident angle θ2, these two light beams impinge upon the object 7 to be measured moving at a velocity V.

Here, the lens 21 and the lens unit 25 form the afocal optical system with a magnification of 2 within the XY plane. The relationship between their focal lengths is:

$$f2/f1=2 \quad (6)$$

The distance between the first lens 21 and the principal plane opposing the second lens unit 25 is equal to f2+f1.

The light beams 5g and 5h, scattered by the irradiated object 7 to be measured, pass through the second lens unit and through the holes of the converging lens 26 to form converged light beams, which are input to the photodetector 9. The converging lens 26 is a meniscus lens to reduce aberration. From Formulas (3), (5), and (6), the Doppler frequency of the light beat signal containing velocity information obtained by the photodetector 9 is given by:

$$F=V/d \quad (7)$$

This formula is used to compute the velocity V of the object 7 to be measured at a signal processing system (not shown) from the beat frequency F of the signal detected by the photodetector 9.

Here, the cylindrical lens 22 converges and collimates the light beams 5g and 5h from the second lens unit 25, so that in the measurement range they form an elliptical shape with a considerably high oblateness. Therefore, the light beam diameter in the direction of speed detection is increased, improving the S/N value of the signal.

The components are fixedly placed on a substrate 201 preferably made of aluminum alloy with a thermal expansion coefficient of $24 \times 10^{-6}/°C$.

Precisional errors of the laser Doppler speed meter 20 due to temperature changes are given, with the reference temperature set at 25° C. The laser beam of the laser diode 1 is assumed to have a wavelength λ of 790 nm at a temperature of 25° C., and a temperature dependency of 0.2 nm/°C.

When the wavelength of the laser beam alone changes due to temperature, so that no changes occur in the lens interval, the precisional errors which occur in a construction with a diffraction grating pitch of 10 μm and an interference fringe pitch of 10 μm are as given in Table 1.

TABLE 1

| Temperature | Wavelength | Error |
|---|---|---|
| 0° C. | 775 nm | +0.130% |
| 25° C. | 780 nm | 0% |
| 50° C. | 785 nm | −0.129 |

On the other hand, when only changes in the lens interval, caused by the thermal expansion of the aluminum alloy, occur due to temperature changes, so that the wavelength of the laser beam does not change, the precisional errors which occur in a construction with a diffraction grating pitch of 10 μm and an interference fringe pitch of 10 μm are as given in Table 2. (Here, the distance between the first lens 21 and the second lens unit is about 135 mm.)

TABLE 2

| Temperature | Distance | Error |
|---|---|---|
| 0° C. | −80 μm | −0.128% |
| 25° C. | 0 μm | 0% |
| 50° C. | +80 μm | +0.128% |

In the present embodiment, changes in the wavelengths and thermal expansion due to temperature occur at the same time, so that the optical errors produced by these two factors cancel out, as shown in Table 3 where the optical errors are ultimately almost zero.

TABLE 3

| Temperature | Error |
|---|---|
| 0° C. | +0.001% |
| 25° C. | 0% |
| 50° C. | −0.001% |

Figure 5:
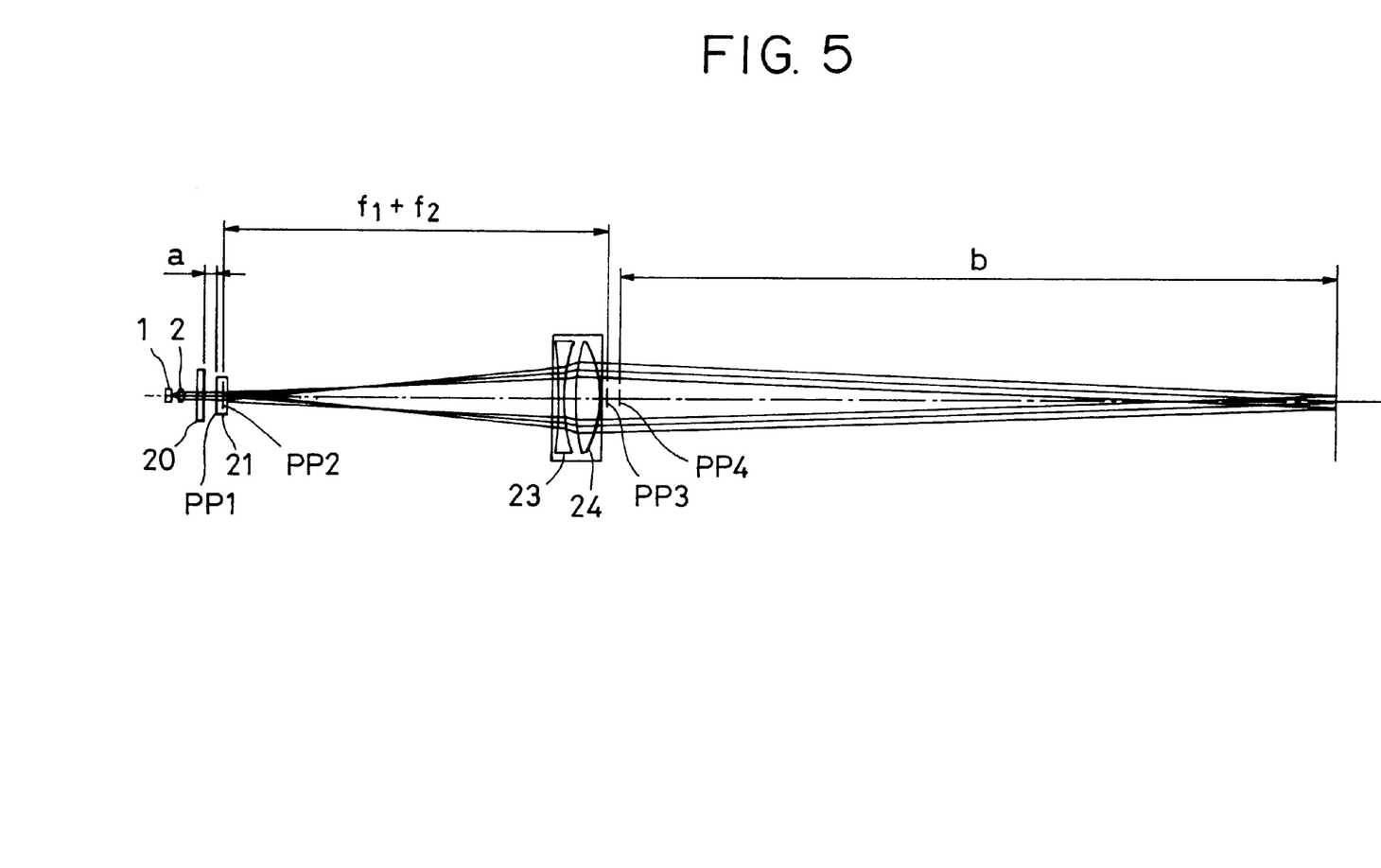
FIG. 5 is a view showing an afocal optical system of the present embodiment.

FIG. 5 is a view showing the afocal optical system in the present invention. PP1 and PP2 denote, respectively, the object side and image side principal planes of the first lens 21, while PP3 and PP4 denote, respectively, the object side and image side principal planes of the second lens unit 25. As can be seen from FIG. 5, the principal planes PP3 and PP4 of the second lens unit are positioned closer to the object to be measured than the body of the laser Doppler speed meter. Therefore, the actual distance between the first lens 21 and the second lens unit can be made smaller than the distance f2+f1, so that the size of the laser Doppler speed meter itself is made smaller. At the same time, the actual working distance can be made larger than the distance b between the image side principal plane PP4 of the second lens unit and the object 7 to be measured. Consequently, the measuring apparatus can be made small and provide a large working distance.

Figure 6:
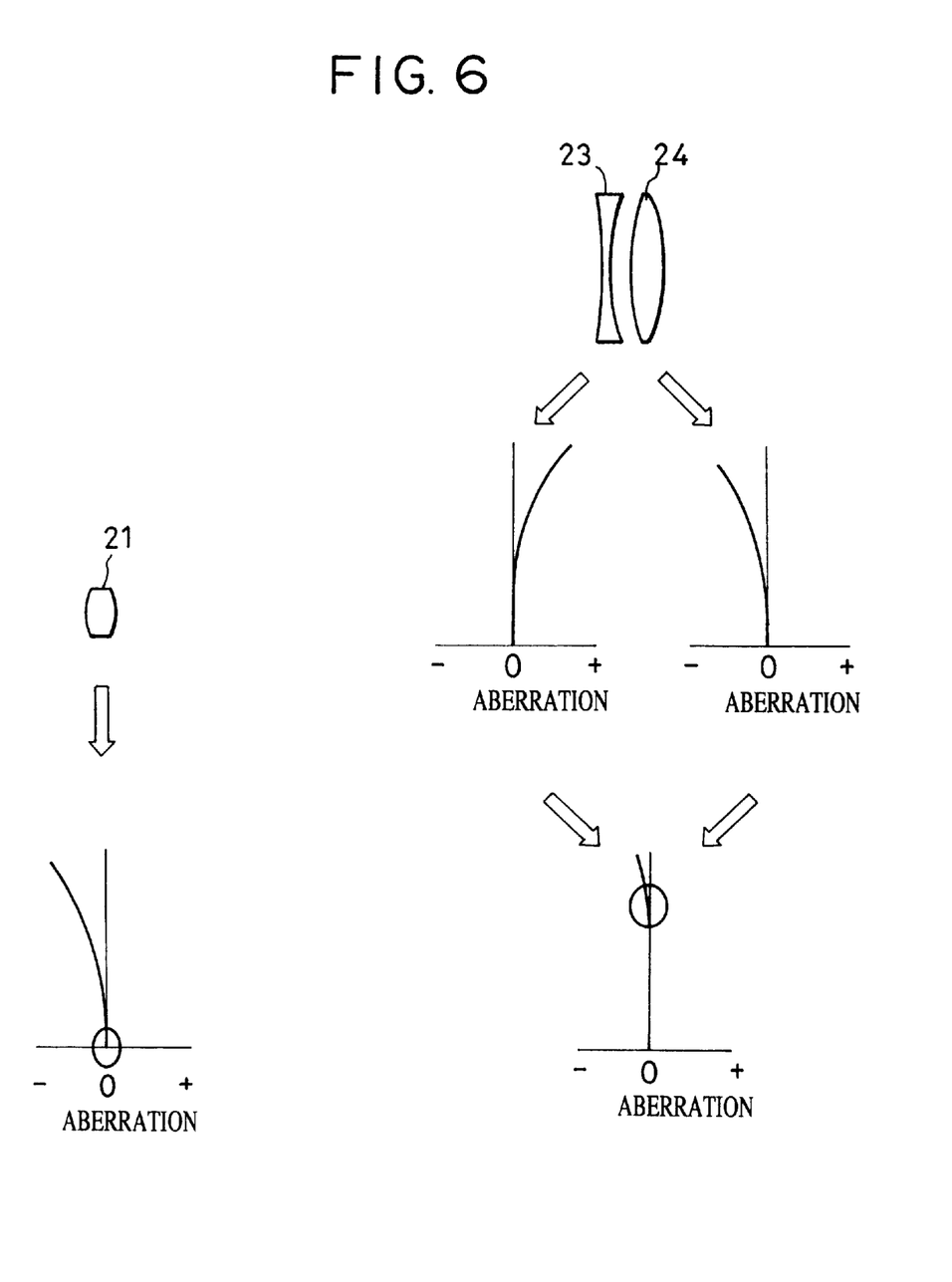
FIG. 6 illustrates spherical aberrations of the lenses of the second lens unit.

FIG. 6 illustrates diagrams showing spherical aberrations of the first lens 21 and the second lens unit 25. The left diagram shows the aberration of the first lens. The left diagram of the right center diagrams shows the aberration of the biconcave lens 23, while the right diagram of the right center diagrams shows the aberration of the biconvex lens 24. The diagram below the right center diagrams shows the aberration of the entire second lens unit. As can be seen from FIG. 6, the second lens unit is designed by combining a lens with a negative refractive power and a lens with a positive refractive power in order to easily obtain a suitable aberration value for the entire second lens unit. In the present embodiment, the construction of the second lens unit consists of a combination of a lens with a negative refractive power and a lens with a positive refractive power, so that the aberrations in the entire second lens unit considerably cancel out. The light beams from the first lens 21 converge temporarily, and impinge upon the second lens unit 25 with a spherical aberration curve which tilts in a direction opposite to the tilting of the spherical aberration curve of the first lens 21. Since the construction provides a large working distance, the position where the light beam impinges upon the second lens unit is further away from the optical axis than the position where the light beam impinges upon the first lens 21. However, by constructing the second lens unit such that the aberrations in the entire second lens unit cancel out considerably, the tilting of the aberration curve at the location where the light beam impinges upon the second lens unit 25 can be made to substantially coincide with the tilting of a curve obtained by enlarging the aberration curve at the location where the light beam impinges upon the first lens 21 in a direction vertical to the optical axis by the magnification of the afocal optical system. Therefore, the aberrations occurring at the first lens 21 and the second lens unit 5 add up, as a result of which the final light beam leaving the lens unit is substantially free from aberration within the XY plane which directly affect measurements, thereby ensuring a stable and accurate large measurement depth.

As can be understood from the foregoing description, the laser Doppler speed meter 200 is so constructed as having a working distance of 300 mm when the speed meter 200 is 200 mm long, a measurement depth of ±30 mm or more, and an optical precision kept at ±0.03% or less.

The individual components shown in outline or designated by blocks in the drawings are well-known in the optical displacement measurement art, and their specific construction and operation are not critical to the operation or best mode for carrying out the invention. While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as not to encompass all such modifications and equivalent structures and functions.

What is claimed is:

1. An apparatus for obtaining displacement information of an object, comprising:
    a light source;
    a diffraction grating for dividing a light beam from said light source into two light beam portions;
    a lens system for causing the two light beam portions from said diffraction grating to intersect and impinge upon the object, said lens system including a first lens unit and a second lens unit receiving the two light beam portions, each of the two light beam portions being condensed at least with respect to the beam-dividing direction of said diffraction grating by said first lens unit, said second lens unit having a focal length larger than a focal length of said first lens unit to form an afocal system within a plane containing at least the two light beam portions, said second lens unit including only two lenses which are, from the side where the light beams impinge upon said second lens unit, a lens with a negative refractive power and a lens with a positive refractive power; and a light-receiving device for receiving the light beams from said lens system scattered by the illuminated object in order to obtain displacement information of the object.

2. An apparatus according to claim 1, a distance from said diffraction grating to said first lens unit being smaller than the focal length of said first lens unit.

3. An apparatus according to claim 1, the principal plane of said second lens unit at the object side being located closer to the object than the surface of said second lens unit which opposes the object.

4. An apparatus according to claim 1, further comprising a converging lens for converging the light beams scattered from the object onto said light-receiving device, said second lens unit and said converging lens guiding the light beams scattered from the object onto said light-receiving device.

5. An apparatus according to claim 4, said converging lens being a meniscus lens.

6. An apparatus according to claim 1, further comprising a member for displacing at least a portion of said lens system in accordance with temperature changes, such that measurement errors caused by changes in wavelength of the light beams resulting from temperature changes in said light source cancel out.

7. An apparatus according to claim 1, further comprising a member for converging the two light beams onto the object within a plane vertical to a plane containing the two light beams.

8. An apparatus for obtaining displacement information of an object, comprising:

a light source;

a diffraction grating for dividing a light beam from said light source into two light beam portions;

a lens system for causing the two light beam portions from said diffraction grating to intersect and impinge upon the object, said lens system including a first lens unit and a second lens unit receiving the two light beam portions, each of the two light beam portions being condensed at least with respect to the beam-dividing direction of said diffraction grating by said first lens unit, said second lens unit having a focal length greater than a focal length of said first lens unit to form an afocal system within a plane containing at least the two light beams, the principal plane of said second lens unit at the side of the object being located closer to the object than a surface of said second lens unit which opposes the object; and a light-receiving device for receiving the light beams from said lens system scattered by the illuminated object in order to obtain displacement information of the object.

9. An apparatus according to claim 8, a distance from said diffraction grating to said first lens unit being smaller than the focal length of said first lens unit.

10. An apparatus according to claim 8, further comprising a converging lens for converging the light beams scattered from the object onto said light-receiving device, said second lens unit and said converging lens guiding the light beams scattered from the object onto said light-receiving device.

11. An apparatus according to claim 10, said converging lens being a meniscus lens.

12. An apparatus according to claim 8, further comprising a member for displacing at least a portion of said lens system in accordance with temperature changes, such that measurement errors caused by changes in wavelength of the light beams resulting from temperature changes in said light source cancel out.

13. An apparatus according to claim 8, further comprising a member for converging the two light beams onto the object within a plane vertical to a plane containing the two light beams.

\* \* \* \* \*

UNITED STATES PATENT AND TRADEMARK OFFICE
CERTIFICATE OF CORRECTION

PATENT NO. : 5,926,276
DATED : July 20, 1999
INVENTOR(S): Takamiya et al.

It is certified that error appears in the above-identified patent and that said Letters Patent is hereby corrected as shown below:

COVER PAGE AT ITEM [56] FOREIGN PATENT DOCUMENTS:

"407055940" should read --07-055940--.

Signed and Sealed this

Twentieth Day of June, 2000

Attest:

Q. TODD DICKINSON

*Attesting Officer*   *Director of Patents and Trademarks*